United States Patent
Moslehi et al.

(10) Patent No.: US 11,953,389 B2
(45) Date of Patent: Apr. 9, 2024

(54) OPTICAL SENSING SYSTEM WITH SEPARABLE SPECTRALLY OVERLAPPING SENSOR RESPONSES

(71) Applicant: Intelligent Fiber Optic Systems Corporation, San Jose, CA (US)

(72) Inventors: Behzad Moslehi, Los Altos, CA (US); Mehrdad Moslehi, Los Altos, CA (US)

(73) Assignee: Intelligent Fiber Optic Systems Corporation, Milpitas, CA (US)

( * ) Notice: Subject to any disclaimer, the term of this patent is extended or adjusted under 35 U.S.C. 154(b) by 0 days.

(21) Appl. No.: 17/190,390

(22) Filed: Mar. 2, 2021

(65) Prior Publication Data

US 2022/0283045 A1    Sep. 8, 2022

(51) Int. Cl.
G01L 1/24 (2006.01)
G01D 5/353 (2006.01)
G01K 11/3206 (2021.01)

(52) U.S. Cl.
CPC .......... *G01L 1/246* (2013.01); *G01D 5/35387* (2013.01); *G01K 11/3206* (2013.01)

(58) Field of Classification Search
None
See application file for complete search history.

(56) References Cited

U.S. PATENT DOCUMENTS

| | | | | |
|---|---|---|---|---|
| 7,127,132 B1* | 10/2006 | Moslehi | ............ | G01L 1/246 |
| | | | | 385/12 |
| 2009/0185772 A1* | 7/2009 | Xia | ............ | G01K 11/3206 |
| | | | | 385/13 |
| 2014/0268099 A1* | 9/2014 | Moslehi | ............ | G01L 1/246 |
| | | | | 356/32 |

* cited by examiner

*Primary Examiner* — Chad H Smith
(74) *Attorney, Agent, or Firm* — File-EE-Patents.com; Jay A. Chesavage

(57) ABSTRACT

An optical sensing system including an optical interrogator is operative with an array of reflective sensors, each sensor providing a separable reflected spectral response parameter such as a unique Gaussian standard deviation or reflected response compared to other sensors in the same operating wavelength range. The optical interrogator provides narrowband swept or broadband continuous optical power source to the array of FBG sensors, and an optical interrogator generates a g(x) representation of power vs wavelength of the reflected optical power and decomposes the representation into the wavelength of the individual sensors, thereby allowing operation of two or more FBG sensors in the same operating wavelength range.

17 Claims, 4 Drawing Sheets

*Figure 2A*
unique FWHM bandwidth FBGs

*Figure 3*
Tunable Laser Interrogator

*Figure 4*
unique FWHM bandwidth FBGs

Figure 5A

$$y = 5e^{-\frac{(x-0)^2}{2(.17)^2}} + 5e^{-\frac{(x-2)^2}{2(.35)^2}} + 5e^{-\frac{(x-5)^2}{2(.71)^2}}$$

OPTICAL SENSING SYSTEM WITH SEPARABLE SPECTRALLY OVERLAPPING SENSOR RESPONSES

FIELD OF THE INVENTION

The present invention relates to an optical sensing system, including spectrally multiplexed fiber-optic sensors. In particular, the invention relates to a reflective or transmissive sensor system comprising a plurality of Fiber Bragg Grating (FBG) sensors used in a sensor system such as interrogator which provides for resolving and quantifying responses from multiple FBG sensors operating in a specified range of optical band wavelengths. The present invention may also be extended to fiber-optic sensing systems comprising Fabry Perot Interferometer (FPI) sensors.

BACKGROUND OF THE INVENTION

There are many examples of FBG sensor systems in the prior art, typically utilizing an FBG sensing element which reflects a relatively narrowband spectral slice (typically a fraction of 1 nanometer up to few nanometers) of optical power centered at a wavelength, known as Bragg wavelength, positioned in an operating range of wavelengths within an optical spectral band. A practical aspect of an FBG sensor system is that a plurality of FBG sensors may be positioned at different locations on a single continuous optical fiber, and reflected (or transmitted) optical power from each of the FBG sensors measured to determine a desired measurement parameter, also known as measurand. The FBG element may be part of a fiber-optic sensor system (for instance, written into the core of an optical fiber), where the FBG is sensitive to temperature, strain, or where the FBG sensor acts as a proxy for a parameter to be sensed which is converted to a strain value or a temperature value via a suitable transducer material. A disadvantage of prior art FBG arrays positioned within an optical fiber is that these prior art systems are unable to resolve, with sufficient accuracy and consistency, a first sensor which is operating within the limits of a first range of wavelengths from a second sensor which appears at least partially extending into the first range of wavelengths, other than by temporal tracking, but even then, in general, once the two sensors are reflecting at a single wavelength, it is not possible to perform spectral signal partitioning to identify one sensor from another, and after two sensors partially or fully cross each other in a common spectral wavelength range, the ambiguity in sensor identification becomes intractable. For this reason, prior art sensing systems operate with each sensor in a specified range of non-overlapping operating wavelength, hence, limiting the maximum number of non-overlapping FBG sensors which can be placed within an optical fiber, depending on the available optical bandwidth of the interrogator and the required dynamic range of measurands. If this constraint on the number of sensors were removed or alleviated, it would be possible to increase sensor density or the maximum number of FBG sensors within an optical fiber for a given interrogator optical bandwidth by providing that multiple sensors operate within the same range of operating wavelength, including reducing the spectral spacing of FBG sensors with adjacent Bragg wavelengths. Additionally, the measurement dynamic range of each sensor can be further increased, and the requirements of the optical source bandwidth and other system components can be reduced, resulting in reduced overall system cost per sensor.

Accordingly, it is desired to provide a system for spectrally multiplexed FBG sensors where multiple sensors may operate in a resolvable and quantitative manner in a shared or overlapping range of wavelengths, including partially or fully overlapping spectral ranges for various FBG sensors positioned within an optical fiber.

OBJECTS OF THE INVENTION

A first object of the invention is an optical interrogator having an optical source, such as either a broadband optical source or a tunable narrowband optical source such as a tunable laser source, sufficient to generate optical energy over at least one operating range of wavelengths, the interrogator receiving optical reflections from an FBG sensor array, at least two optical reflections from different FBG sensors operating in the same operating range and having at least partially overlapping spectral responses, the optical interrogator separating the two partially or fully overlapping responses based on the spectral profile shape of the overlapping optical power or intensity responses as determined by either tuning the tunable source over the range of wavelengths or by examination of reflected optical energy by wavelength-selective photodetectors to form a spectral reflection profile, iteratively identifying each sensor according to optical power (or alternatively intensity) vs wavelength shape (FBG spectral response profile), and subtracting each estimated sensor profile from the response and noting a center reflection wavelength for each subtracted sensor profile.

A second object of the invention is an optical (intensity or power vs wavelength) interrogator having a broadband optical source sufficient to generate optical emission power over at least one continuous operating range of wavelengths, the optical interrogator receiving wavelength-selective optical reflections from an FBG sensor array, at least two optical reflections from different FBG sensors operating in the same operating range and having at least partially overlapping responses, the optical interrogator sampling optical power in discrete wavelength regions with wavelength-selective (or optical band selective) optical detectors (photodetectors), thereafter separating the at least two partially or fully overlapping optical responses using a suitable method, such as by taking a Fourier transform, identifying an individual grating response, and separating the individual response in an iterative fashion. The process of identifying individual grating response may be performed either in real time or as post processing after collection of FBG array sensor data from an optical fiber.

A third object of the invention is a sensor system comprising an optical (power or intensity vs wavelength) interrogator and a uniquely separable sensor array comprising a plurality of fiber Bragg gratings (FBGs), each FBG having a unique full-width half-maximum (FWHM) optical bandwidth and different from any other FBG positioned on the same optical fiber, the plurality of FBG sensors operative in a common optical band or wavelength range, the FBGs coupled to the optical (power or intensity vs wavelength) interrogator, the optical interrogator providing a plurality of reflected optical power vs wavelength responses from a plurality of wavelength-specific (wavelength-selective) sensors, the wavelength-specific sensors coupled to a plurality of cross correlators, each cross correlator performing a cross correlation function between the responses of the plurality of wavelength-specific FBG sensors and a plurality of response templates, each response template matching a corresponding FBG sensor reflection response. Such cross correlation calculations may be performed either in real time or as post processing upon collection of the sensing data from the FBG sensor array by the optical interrogator.

A fourth object of the invention is sensor array comprising a plurality of fiber Bragg grating (FBG) sensors, each FBG having a unique bandwidth (for example, bandwidth specified as FWHM, although other measures of bandwidth, such as the standard deviation of a Gaussian profile, may also be used), the plurality of FBGs operative in a common range of optical band or wavelengths, each FBG reflecting a fraction of incoming optical source power, the reflected optical source power within the unique spectral bandwidth for an associated FBG, the reflected optical power directed to a plurality of wavelength-specific (or wavelength-selective) sensors for identifying a center reflected wavelength and bandwidth for each FBG.

A fifth object of the invention is an FBG sensor array having a plurality of FBG sensors which are operative over a particular range of wavelengths, where each sensor operating in the particular range of wavelengths provides a reflected power or spectral wavelength profile which is unique from the reflected intensity or power vs wavelength profile of other sensors operating in the particular range of optical band wavelengths.

A sixth object of the invention is an optical (optical intensity vs wavelength) interrogator having a broadband optical source sufficient to generate optical emission power over at least one operating range of wavelengths, the interrogator receiving optical reflections from a sensor array, at least two optical reflections from different FBG sensors operating in the same operating range and having partially or fully overlapping responses, the wavelength interrogator separating the two partially or fully overlapping responses based on the wavelength shape of the overlapping responses.

SUMMARY OF THE INVENTION

In a first aspect of the invention, a plurality of Gaussian (or near-Gaussian) response FBG sensors are operative to reflect incoming broadband optical energy, thereby providing a reflected optical intensity or power profile which matches each FBG sensor, and each FBG sensor of the plurality of FBG sensors has a unique Gaussian (or near Gaussian) reflection response bandwidth. The Gaussian response profile of each FBG refers to a Gaussian (or near Gaussian) shape of the reflected optical power centered at the Bragg wavelength of the FBG and having a specified Gaussian (or near Gaussian) response profile bandwidth as specified by FWHM or another bandwidth measure. An optical interrogator which is providing the broadband optical power is also sampling an optical power vs wavelength response for the plurality of Gaussian (or near Gaussian) response FBG sensors over a range of optical wavelengths, the optical power vs wavelength responses used to determine a center identifying each FBG based on its associated bandwidth.

In a second aspect of the invention, an array of FBG sensors is formed along an extent of an optical fiber, such as a single-mode fiber (SMF), at least two sensors configured to reflect optical power in the same operating range of wavelengths. The at least two FBG sensors are configured to provide separable power (or intensity or amplitude) vs wavelength responses, such that the reflected optical power vs wavelength profile provides a unique "signature" for isolation and identification of each FBG response profile by an optical interrogator system. In another aspect of the invention, the at least two sensors provide an optical power (or alternatively intensity, or amplitude) vs wavelength response which are uniquely separable from each other even while occupying the same range of wavelengths or at least partially superimposed on or overlapping each other.

In a third aspect of the invention, an optical power (or intensity or amplitude) vs wavelength interrogator provides broadband optical power over an operating range of wavelengths, and receives reflected optical power from a plurality of FBG sensors reflecting optical power in the operating range of optical wavelengths, each of the plurality of FBG sensors reflecting optical power providing an optical reflected response profile which is unique from other FBG sensors of the plurality of FBG sensors in providing a uniquely shaped optical power or wavelength response (or alternatively optical frequency response profile). For example, each FBG sensor may provide a unique Gaussian (or approximately Gaussian) full width half max (FWHM) reflective bandwidth, or one sensor may provide a chirp function with an increasing optical power vs wavelength, and a second sensor may provide a chirp function with a decreasing optical power vs wavelength. The interrogator examines optical power (or alternatively amplitude) vs wavelength profiles of the resulting combined reflection, and resolves or partitions the superposition of response into particular sensors based on their uniquely identifiable reflected power vs wavelength profiles, and resolves the response profile of each FBG sensor to a particular spectral wavelength and associated sensor measurement profile.

DETAILED DESCRIPTION OF THE INVENTION

Figures 1, 1A:
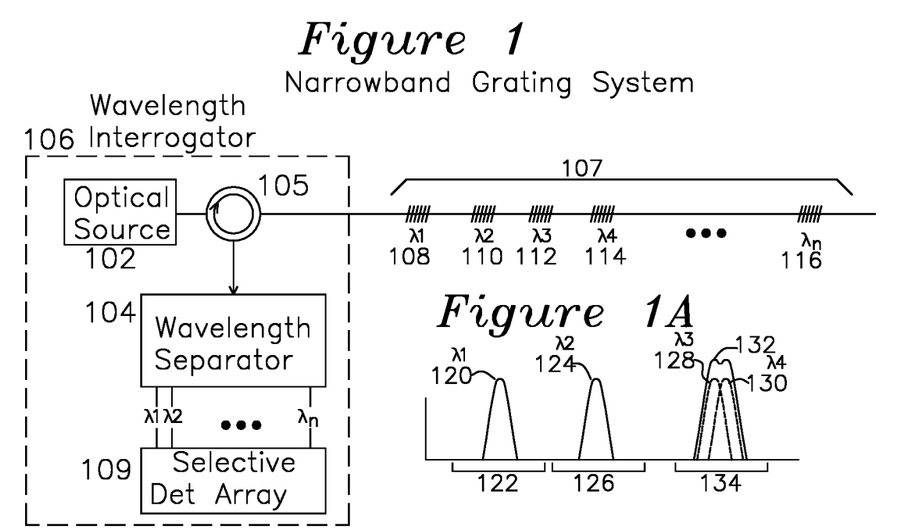
FIG. 1 shows a block diagram for an FBG sensing system and optical interrogator, each FBG sensor operating in a spectral wavelength range.
FIG. 1A shows a plot of FBG reflected wavelength profiles for the system of FIG. 1.

FIG. 1 shows an optical power vs wavelength interrogator 106 coupled to an array of narrowband FBG sensors 107. In an example of the invention, each FBG sensor 108, 110, 112, 114 through 116 receives broadband optical source emission power from the optical power vs wavelength interrogator 106, and each FBG sensor is operative to reflect a fraction of the incoming optical power at a respective range of wavelengths 122, 126, and 134. Each FBG sensor operates to substantially pass or transmit optical power outside of its particular reflective narrow spectral band of operation to a subsequent sensor and is operative to generate a narrowband (typically with a bandwidth chosen between a fraction of nanometer up to several nanometers) reflection centered at its Bragg wavelength 120, 124, 128, corresponding to its own FBG sensor reflective center wavelength, shown for FBG sensors 108, 110, and 112 as example wavelengths λ1, λ2, and λ3, respectively.

Optical power vs wavelength interrogator 106 includes optical source 102 for generating broadband optical emission power which spans the operating wavelength ranges 122, 126, and 134 of FIG. 1A. The broadband optical power is directed from optical source 102 to circulator 105, which directs the source optical power to sensor array 107 with low to negligible attenuation, and the reflected optical power from each FBG sensor, shown only as 108, 110, 112, and 116, is directed back to circulator 105, which directs the reflected optical power from various FBG sensors positioned on the fiber to wavelength selector 104 and wavelength-selective optical detector array 105. The wavelength selective detector array 105 may use any of a wide variety of different spectral wavelength partitioning and detection methods, one example method is to utilize an Arrayed Waveguide Grating (AWG) filter, which provides a series of wavelength-selective optical outputs which can be applied to individual optical detectors (or plurality of optical detectors occupying a spectral band), and the detector responses will indicate optical power levels at various wavelengths which can be compared in adjacent spectral channels to resolve the FBG reflected optical power to great precision. A pair of spectrally adjacent AWG channels is used to generate a differential signal for improved wavelength discrimination, as described in U.S. Pat. No. 8,983,250, assigned to the applicant in the present patent application, and is incorporated by reference.

The method of FIGS. 1 and 1A requires that individual FBGs operate in unique wavelength ranges, such as 122, 126, and 134 of FIG. 1A for FBG reflected responses 120, 124, and 128. A limitation of this method is shown when a fourth FBG response 130 is added into the same wavelength range 134, which results in the spectrally overlapping FBG responses 128 and 130, which superimpose to form the overlapping response 132. It is no longer possible to determine which FBG sensor is which if one sensor moves on the opposite side of the other sensor's reflection wavelength, and it is not possible to provide accurate measurement wavelengths for shape 132 after divergence of the responses.

Figure 2:
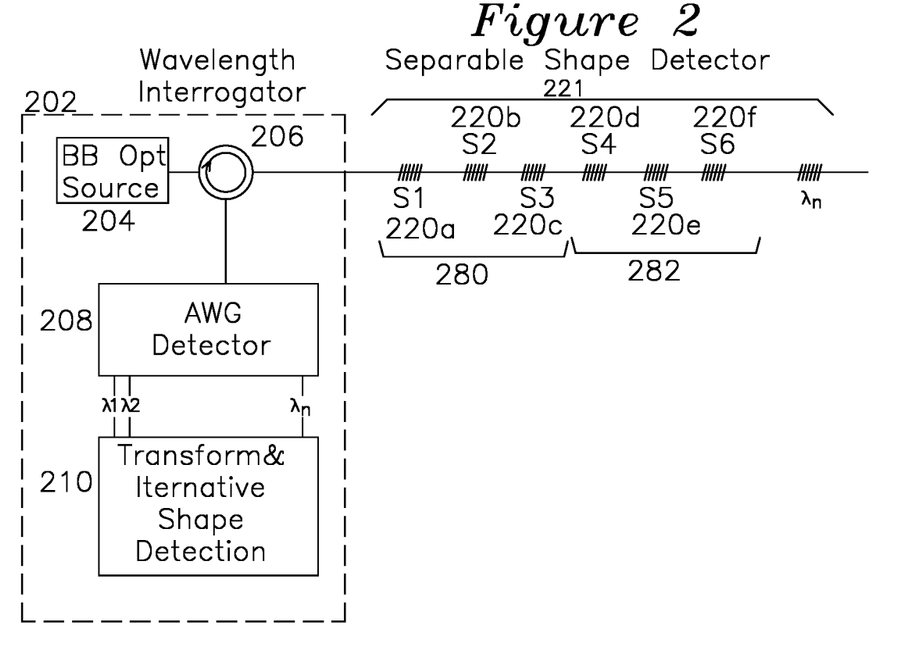
FIG. 2 shows a block diagram for a separable wavelength sensor system operating with an array of FBG sensors generating unique optical power vs wavelength shapes.

FIG. 2 shows an example separable shape detector 202 of the present invention. An array of FBG sensors 221 comprises individual FBGs 220a, 220b, 220c, 220d, 220e, 220f, etc., and each FBG returns a unique spectral shape (with unique Gaussian Full Width Half Maximum (FWHM) or near-Gaussian FWHM) rather than a fixed Gaussian response as was shown in FIG. 1A. In one example of the invention, each grating 220a, 220b, 220c, 220d, 220e, 220f is a Gaussian response grating but each with a different FWHM or bandwidth, or alternatively a Gaussian response standard deviation σ (wherein Gaussian FWHM≈2.355 σ). Each grating 220a, 220b, 220c, 220d, 220e, 220f may have a different FWHM, or range of wavelengths accommodating each FWHM grating may be used, so that the FWHM profile is unique in each wavelength range, but may be repeated in a different wavelength range. For example, FBGs 220a and 220d may have the same first FWHM, 220b and 220e may have the same second FWHM, and 220c and 220f may have the same third FWHM, but 220a, 220b, and 220c are operative in a first wavelength range as a group 280 which is distinct from a second wavelength range containing a group 282 having FBGs 220d, 220e and 220f. The number of groups of the present invention may be 1 or an integer greater than 1. The optical power vs wavelength interrogator 202 may operate with a broadband optical source 204, circulator 206 for directing optical power to the FBG array 221, and directing reflected optical power to AWG detector 208, and individual detectors, at least one for each wavelength range, to shape detection processor 210.

Figure 2A:
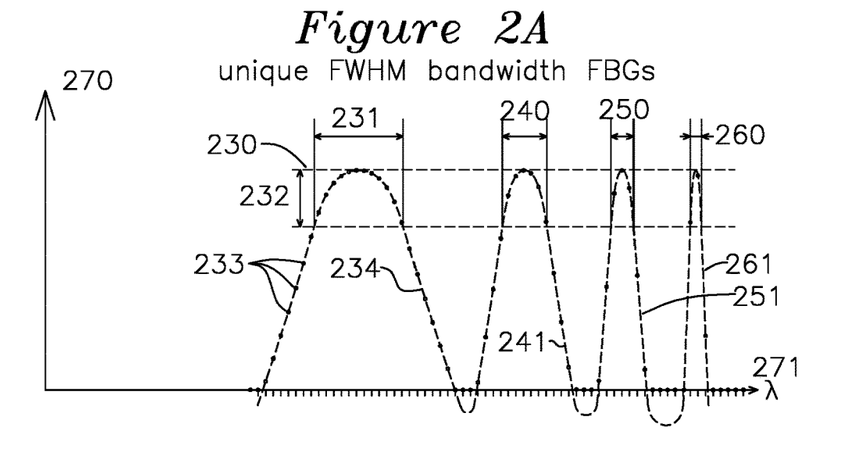
FIG. 2A shows a plot of FBG reflected optical power vs wavelength profiles for the sensors of FIG. 2, where the FBG sensors have Gaussian reflected power vs wavelength responses with unique standard deviations or Gaussian sigma ($\sigma$) values (Gaussian FWHM≈2.355 $\sigma$).

FIG. 2A shows plots for the operation of separable shape sensor 202 of FIG. 2. An example set of four FBGs, each with a unique FWHM 231 for Gaussian profile 234, FWHM 240 for Gaussian profile 241, FWHM 250 for Gaussian profile 251, and FWHM 260 for Gaussian profile 261. Each FWHM for a particular FBG response is unique and/or distinguishable from the FWHM of a different FBG response. The optical interrogator 202 of FIG. 2 is operative with individual discrete detectors operating at specific wavelengths, such as provided by an AWG filter (demultiplexer) having a plurality of optical separation channels, typically one for each detector, and so the detector response comprises discrete points for each detector shown as detector samples 233 for each detector. The optical interrogator of FIG. 2 has the advantage of simultaneous interrogation operation, since it can sample all FBGs on the same optical fiber concurrently during the same time interval, but also has the disadvantage of being unable to provide a continuous distribution or plot of the reflected wavelength over a range of wavelengths.

Figure 3:
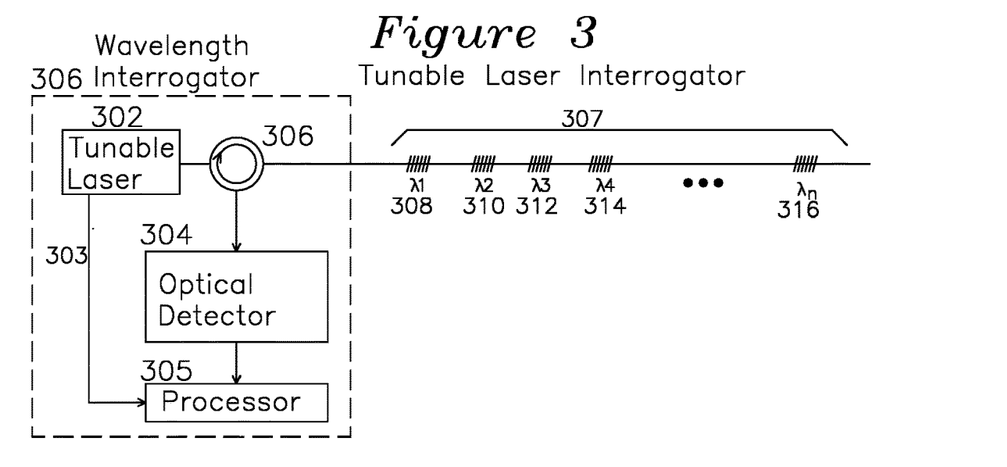
FIG. 3 shows a block diagram of a tunable laser source-based optical interrogator and array of FBGs.
Figure 4:
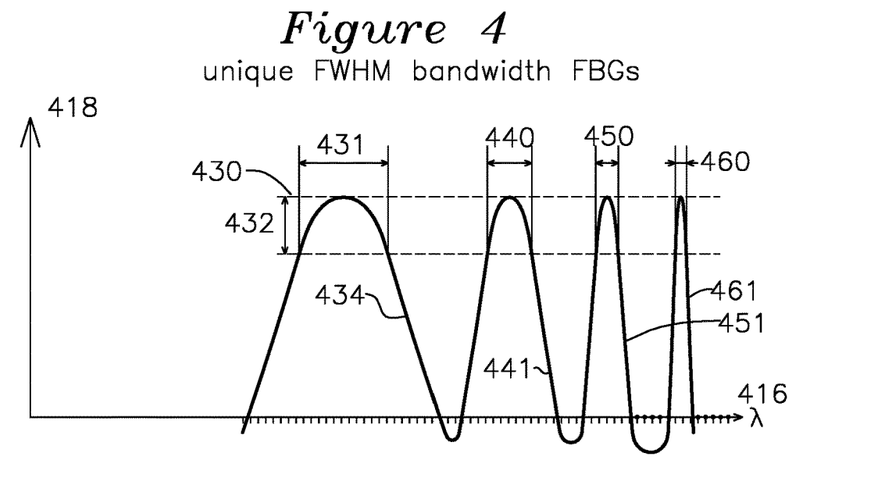
FIG. 4 shows a plot of the optical detector 304 of FIG. 3 over a range of wavelengths for an FBG array with separable sensor characteristics.

The tunable laser optical interrogator of FIG. 3 addresses this problem with narrowband tunable laser source 302, which directs a swept range of wavelengths through circulator 306, which is reflected by the FBG array 307, as before. The FBG array responses are directed to a broadband optical detector 304, which, in combination with the laser wavelength control signal 303, provides for a temporal construction of the continuous plot shown in FIG. 4 of optical power 418 vs wavelength 416 limited only by the granularity of power quantization.

A special consideration of systems which have multiple FBGs reflecting optical power at a particular wavelength is to use care to avoid creating unintentional Fabry Perot interferometric cavities in the optical fiber separating the FBGs when the FBGs are operating at the same wavelength. This may be addressed by the geometrical spacing between FBGs, which spacing acts to reduce or eliminate the coherence and increase the randomness of the reflected optical power between the gratings, or to reduce the reflectivity of the FBG. It is believed that high reflectivity FBGs may need to be separated by separation distances at least on the order of at least a few centimeters (cm), and low reflectivity FBGs may need to be spaced by separation distances at least on the order of only a few millimeters (mm).

Figure 5A:
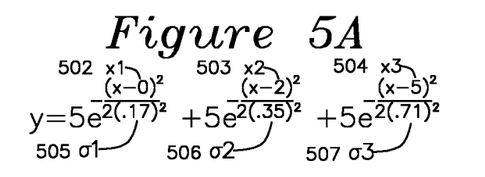
FIG. 5A shows an equation form for a superposition of Gaussian responses.

FIG. 5A shows a linear combination of Gaussian functions, each component of the well-known Gaussian function form $$\gamma = \alpha e^{-\frac{(x-x\mu_1)^2}{2\sigma^2}}$$

where $\alpha$ is a peak amplitude (or the peak function value), $\mu_1$ is a peak offset in x, and $\sigma$ is the standard deviation (derivable from bandwidth and FWHM).

Figure 5B:
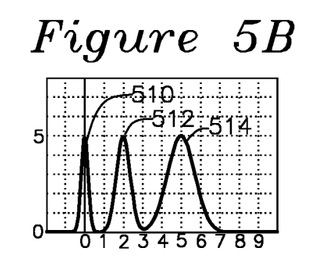
FIGS. 5B, 5C, 5D, 5E, and 5F are example plots of the operation of the FBG interrogator system of FIG. 2 or 3.
Figure 5C:
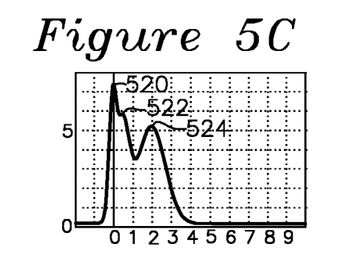

FIG. 5A shows an example of a linear combination or superposition of three terms, all with ∝=5, and with corresponding offsets 502 $\mu_1$=0 and $\sigma_1$=0.17; $\mu_2$=2 and $\sigma_2$ nearly doubled to 0.35; and $\mu_3$=5 and $\sigma_3$ nearly doubled again to 0.71. These terms correspond to the peaks 510, 512, and 514, respectively of FIG. 5B. As can be seen, each peak remains discernable. Using the same respective $\sigma_1$, $\sigma_2$, and $\sigma_3$ but leaving $\mu_0$ at 0 and shifting $\mu_1$ to 0.5 and $\mu_2$ to 2 results in the superposition of responses 520, 522, and 524, respectively, shown in plot of FIG. 5C, and leaving $\mu_0$ unchanged and shifting $\mu_1$ to 1 and $\mu_2$ to 2 results in the superposition of responses shown in the respective responses 530, 532, and 534 shown in FIG. 5D.

Figure 5D:
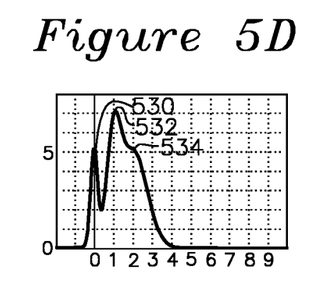
Figure 5E:
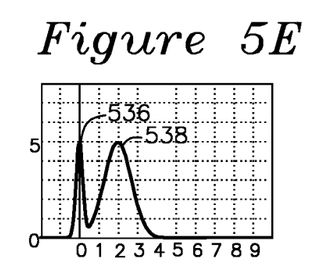
Figure 5F:
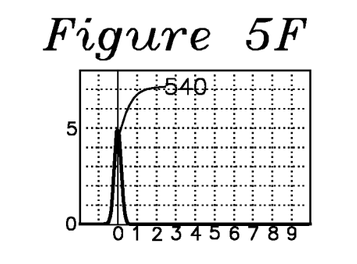

FIG. 5E shows the plot of FIG. 5D with a Gaussian of the term contributing to superposition profile response 532 subtracted out, and FIG. 5F shows the additional subtraction of the Gaussian term corresponding to superposition profile at 538 of FIG. 5E, leaving only plot 540 of FIG. 5F.

In an example of the invention using a quantity of n FBGs with Gaussian spectral reflections, each grating reflecting a unique center (or Gaussian mean) wavelength, width of reflection −3 dB points (FWHM), and magnitude (reflected peak optical power), the plurality of reflected responses forms the series:

$$f(x) = \sum_{i=1}^{n} \alpha_i f_i(x_i, \mu_i, \sigma_i) \quad \text{(Eq 1)}$$

representing a linear combination of Gaussian functions of different bandwidths or sigma values, Gaussian peaks (means), and magnitudes. Each FBG has an optical reflection bandwidth corresponding to the FWHM of the FBG. In the present invention, $\alpha_i, \sigma_i$, and n are known a-priori. Further, $$f_i(x_i, \mu_i, \sigma_i) = \frac{1}{\sigma_i \sqrt{2\pi}} e^{-\frac{(x-x\mu_i)^2}{2\sigma_i^2}} \quad \text{for } i = 1 \ldots n \quad \text{(Equation 2)}$$

$f(x_i, \mu_i, \sigma_i)$ will be the model for the observed composite signal g(x) comprising the superposition of reflected FBG responses from the array of FBG sensors.

In an example of the invention, a search for $u_i$ will be conducted such that the difference between the observed signal g(x) and the theoretical value $f(x_i, \mu_i, \sigma_i)$ can be considered random at a chosen level of significance. The objective is to find the mean $\mu_i$ of each Gaussian component through localizing and separating the components $x_i, \mu_i, \sigma_i$, which may be iteratively performed using automated methods, preferably using an on-board computer integrated with the optical interrogator.

In an example iterative localization method, a first step of decreasing deviations is found, selecting $\gamma > 0$ which satisfies the condition:

$$\gamma < \text{Min}(\sigma_i) \quad \text{(Eq 3)}$$

where Min($\sigma_i$) is the smallest standard deviation value of all FBGs with Gaussian profiles.

In a second step of the iterative localization method, the equation shown below in evaluated:

$$f^*(n) = \sum_{i=1}^{N} \frac{\alpha_1}{\sqrt{\sigma_i^2 - \gamma^2} \sqrt{2\pi}} e^{-\frac{(x-\mu_i)^2}{2(\sigma_i^2-\gamma^2)}} \quad \text{(Eq 4)}$$

Equation 4 above is a linear combination of Gaussian functions, each component of the sum of Gaussian functions having a standard deviation $\sqrt{\sigma_i^2-\gamma^2}$ instead of $\sigma_i$, where $0 < \sqrt{\sigma_1^2-\gamma^2} < \sigma_i$ for every i=1, 2, . . . , n and the other constants $\alpha_i, \mu_i$, n remain unchanged.

In the graphical plots of both functions $f(x)$ and $f^*(x)$, $f^*(x)$ has a more pronounced local maximum, and each peak is narrower and of greater value than those of $f(x)$. If the value of $\gamma$ is sufficiently close to the smallest standard deviation, it may be assumed that the mean component with the smallest standard deviation is exactly the value in which the function has an absolute maximum value.

This maximum value for each component can be found in the manner in which not only the mean of one component, but from the other local maxima, the means of further components with similar standard deviations by iterating with a new value of $\gamma$ which is slightly larger than the previous one.

The next step is to assume success in finding the mean of at least one component of the mixture of responses, and subtract the previous one. In this subsequent step, the difference is formed:

$$\psi_1(x) = f(x) - \alpha_1 f_1(x, \mu_1, \sigma_1) \quad \text{(Equation 5)}$$

and repeat the procedure with a larger value of $\gamma$. Thus, we get a sequence of functions $\{\psi_i(x)\}$ until for some integer i, $\psi_i(x) < \varepsilon$ for all x. In this case, i=n+1, where we have found one of the Gaussian components in each of the steps.

In the specific case where we are using FBGs with known characteristics in a string of FBG sensors returning the superposition of FBG reflection responses over a range of wavelengths, we know the different standard deviation $\sigma_1$ (which can be derived from FWHM), number of sensors n and associated magnitudes (FBG reflectivity) $\alpha_i$.

The process becomes much simpler in choosing $\gamma$.

Localizing of each mean (wavelength at the peak response) is fully described if we specify how to form the function $f^*(x)$ from a given $f(x)$. The preferred FBG spectral partitioning method is the use of the Fourier transform.

The Fourier transform (F{.}) of the Gaussian function may be expressed as:

$$F\{\alpha_i f_i(x_i, \mu_i, \sigma_i)\} = \alpha_i e^{-i\mu_i \omega} e^{-\frac{\sigma_i^2 \omega^2}{2}} \quad \text{(Eq 6)}$$

and similarly:

$$F\{\alpha_i f_i^*(x_i, \mu_i, \sqrt{\sigma_i^2 - \gamma^2})\} =$$

$$\alpha_i e^{-i\mu_i \omega} e^{-\frac{(\sigma_i^2-\gamma^2)\omega^2}{2}} = e^{\frac{\gamma^2 \omega^2}{2}} F\{f(x_i, \mu_i, \sigma_i)\} \quad \text{(Eq 7)}$$

by linearity of the Fourier transform:

$$F\{f^*(x)\} = e^{\frac{\gamma^2 \omega^2}{2}} F\{f(x)\} \quad \text{(Eq 8)}$$

in this manner we may get $f^*(x)$ from a given $f(x)$

These methods may be used to perform numerical calculations by selecting an inverse Fourier transform, such as by using a Fast Fourier Transform (FFT) or Discrete Fourier Transform (DFT), and it becomes possible to also estimate the accuracy of the resulting calculation.

In a first example, two FBGs with Gaussian reflectivity spectral responses and unique bandwidths (expressed as $\sigma_1$ and $\sigma_2$) produce the reflected response:

$$f(x) = \frac{\alpha_1}{\sigma_1\sqrt{2\pi}}e^{-\frac{(x-\mu_1)^2}{2\sigma_1^2}} + \frac{\alpha_2}{\sigma_2\sqrt{2\pi}}e^{-\frac{(x-\mu_2)^2}{2\sigma_2^2}}$$

where:

$\alpha_1 < \alpha_2$ and $\gamma < \text{Min}\{\sigma_1, \sigma_2\}$ $$f^*(x) = \frac{\alpha_1}{\sqrt{\sigma_1^2-\gamma^2}\sqrt{2\pi}}e^{-\frac{(x-\mu_1)^2}{2(\sigma_1^2-\gamma^2)}} + \frac{\alpha_2}{\sqrt{\sigma_2^2-\gamma^2}\sqrt{2\pi}}e^{-\frac{(x-\mu_2)^2}{2(\sigma_2^2-\gamma^2)}}$$

$$F\{f(x)\} = \alpha_1 e^{-i\mu_1\omega}e^{-\frac{\sigma_1^2\omega^2}{2}} + \alpha_2 e^{-i\mu_2\omega}e^{-\frac{\sigma_2^2\omega^2}{2}}$$

$$F\{f^*(x)\} = e^{\frac{\gamma^2\omega^2}{2}}F\{f(x)\} = e^{\frac{\gamma^2\omega^2}{2}}\left[\alpha_1 e^{i\mu_1\omega}e^{-\frac{\sigma_1^2\omega^2}{2}} + \alpha_2 e^{i\mu_2\omega}e^{-\frac{\sigma_2^2\omega^2}{2}}\right]$$

Where the procedure steps are:
1) Take the Fourier Transform (FT) of the observed composite function g(x)
2) Multiply the FT of g(x) by $$e^{\frac{\gamma^2\omega^2}{2}}$$

3) Take the inverse FT to find $f^*(x)$
4) Extract the mean ($u_1$) of the Gaussian with the smallest $\sigma_{min}=\sigma_1$, which is the response associated with the closest match in wavelength.
5) If other mean values $u_i$ are not easily identifiable, repeat the procedure with new updated $\psi$ for $\psi_1(x)=f(x)-\alpha_1 f_1(x_1, \mu_1,\sigma_1)$ for each of the n sensors. At the n+1 step, $\psi_1(x)\approx\epsilon$ is a very small residual value, typically less than 1/100th (1%) of the smallest peak value, or alternatively less than 1/10th (10%) of the smallest peak value.

If $\psi_1(x)$ is sufficiently small, in one example of the invention $\psi_1(x)$ is less than 10% of the smallest peak value, or in another example of the invention, less than 1% of the smallest peak value, the set of matches are considered approximately Gaussian shaped. In another example of the invention, an approximately Gaussian shaped response is one which results in a difference between $\psi_1(x)$ and the a response associated with a closest match which is less than 10%. In another example of the invention, a series of approximately shaped Gaussian responses results in a residual error $\psi_1(x)$ of less than 10% on the final n+1 step. In another example of the invention, an approximately Gaussian shaped response is one with a FWHM which is within 20% of an envelope of a Gaussian response associated with $\alpha_1 f_1(x_1,\mu_1,\sigma_1)$. In another example of the invention, an approximately Gaussian shaped response is one with a FWHM which is within 10% of a FWHM of a Gaussian response associated with $\alpha_1 f_1(x_1,\mu_1,\sigma_1)$. In another example of the invention, an approximately Gaussian shaped response is one where the FWHM of the approximately Gaussian shaped response is within 10% of a true Gaussian shaped response.

In a physical example with FBGs having a Gaussian reflection response, the measured FWHM is approximately equal to $2.355\sigma$. For the following examples, $\text{FWHM}_1$ (specified as frequency band)=25 GHz, which is ~0.2 nm in the wavelength band (typical of an FBG with ~2 mm grating extent and operating in a 1550 nm wavelength range)

$\text{FWHM}_2$ (specified as frequency band)=50 GHz, which is ~0.4 nm in the wavelength band (typical of an FBG with ~1 mm grating extent and operating in a 1550 nm wavelength range)

$\sigma_1$=0.2 nm $\lambda$ corresponding to 10.6 GHz bandwidth at 1550 nm $\sigma_2$=0.4 nm $\lambda$ corresponding to 21.2 GHz bandwidth ($\sigma_2=2\sigma_1$)

The two FBG reflection spectra may overlap and the wavelength of each discernable in a system converting center wavelength to a strain, vibration, temperature, or other proxy for grating period measured by the optical power vs wavelength optical interrogator receiving the superimposed reflected Gaussian responses.

$$f(x) = \frac{\alpha_1}{\sigma_1\sqrt{2\pi}}e^{-\frac{(x-\mu_1)^2}{2\sigma_1^2}} + \frac{\alpha_2}{\sigma_2\sqrt{2\pi}}e^{-\frac{(x-\mu_2)^2}{2\sigma_2^2}}$$

$$f^*(x) = \frac{\alpha_1}{\sqrt{1-\left(\frac{\gamma}{\sigma_1}\right)^2}\sigma_1\sqrt{2\pi}}e^{-\frac{(x-\mu_1)^2}{2\sigma_1^2\left(1-\frac{\gamma}{\sigma_1}\right)^2}} + \frac{\alpha_2}{\sqrt{1-\left(\frac{\gamma}{\sigma_2}\right)^2}\sigma_2\sqrt{2\pi}}e^{-\frac{(x-\mu_2)^2}{2\sigma_2^2\left(1-\frac{\gamma}{\sigma_2}\right)^2}}$$

if $\gamma=0.95\sigma_1=\sqrt{1-(0.95)^2}=0.31$ then the magnitude of the first component increases by a factor of $$\frac{1}{0.31} \approx 3.$$

$$F\{f^*(x)\} = e^{\frac{\gamma^2\omega^2}{2}}F\{f(x)\}$$

Figure 6A:
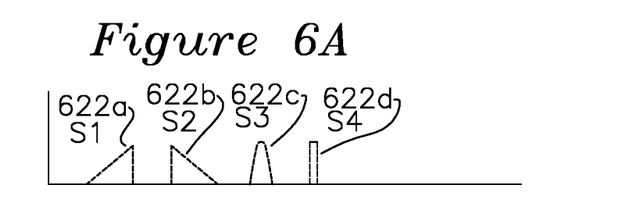
FIGS. 6A, 6B, and 6C show plots for FBGs with unique response shapes.
Figure 6B:
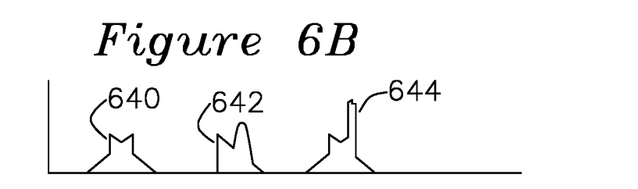
Figure 7:
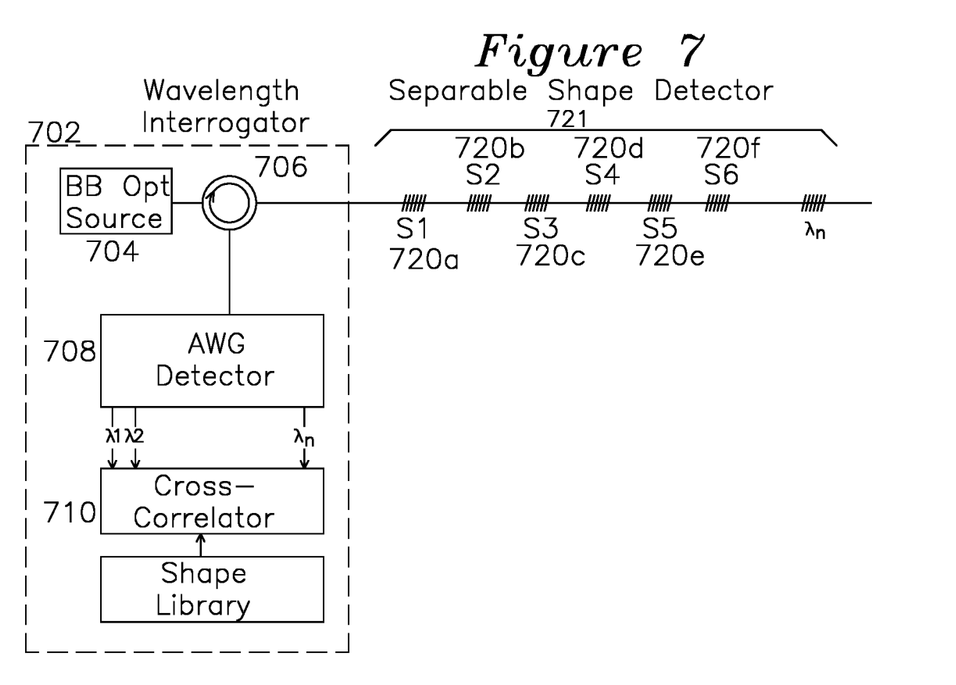
FIG. 7 shows an optical interrogator with cross correlator for use with the grating responses of FIG. 6A.

Another example of the invention may use chirped gratings 720a and 720b of FIG. 7 having response profiles 622a and 622b of FIG. 6A mixed with a Gaussian 622c and flat-top response 622d also shown in FIG. 6A to provide separable reflected wavelength characteristics. For example, the chirped gratings 720a and 720b with amplitude vs wavelength responses of 622a and 622b, respectively, may overlap and form the superimposition waveform 640 of FIG. 6B. By cross correlation of the kernel shapes of 622a, 622b, 622c, and 622d, the overlapping chirped gratings of 640 and 642 may be resolved into 646 and 648, and 650 and 652, respectively, each of which may be further resolved to a particular FBG grating and wavelength, and converted to a corresponding sensor measurement such as strain or temperature.

Figure 6C:
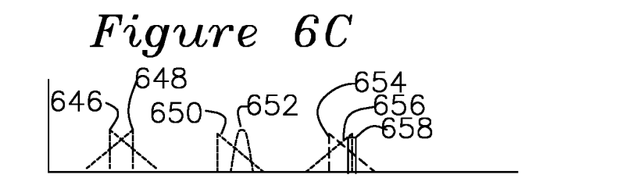

Spectral response 644 shows an example where the superposition of gratings 720a, 720b, and 720e having respective spectral shapes 622a, 622b, and 622d, may be decomposed or partitioned into the individual responses 654, 656, and 658, respectively. Each of the individual responses 654, 656, and 658 may then be resolved to individual wavelengths and associated temperatures or strains.

In practice, a plurality of FBG sensors with unique Gaussian or near-Gaussian shaped reflection spectra FWHM (or sigma) values may be produced by a number of methods including adjusting the lengths of the FBG sensors, with shorter FBGs having fewer gratings providing larger FWHM values compared to longer FBGs with more gratings. For instance, this can be accomplished by fabricating FBGs with lengths in the range of about 1 mm up to over 10 mm.

The present examples are provided for illustrative purposes only, and are not intended to limit the invention to only the embodiments shown.

We claim:

1. A measurement system comprising a plurality of fiber Bragg grating (FBG) sensors arranged on a single optical fiber, the plurality of FBGs operating in a shared range of wavelengths such that at least one FBG sensor reflects optical energy at a same wavelength as another FBG sensor, the plurality of FBGs receiving optical power from an optical interrogator;
   each FBG of the plurality of FBGs having a unique full width half max (FWHM) bandwidth, each of the plurality of gratings reflecting less than 10% of an incoming optical power;
   the optical interrogator receiving reflected optical power, the optical interrogator having at least one optical detector operative to measure reflected optical power at a plurality of wavelengths;
   the optical interrogator operative to generate a representation of response power vs wavelength;
   the optical interrogator operative to identify for a peak response, at least one of: a standard deviation, a Full Width Half Maximum (FWHM) value, or a bandwidth;
   the optical interrogator subtracting a response corresponding to a closest match response of the representation and associating a wavelength to the subtracted response.

2. The measurement system of claim 1 where the optical interrogator continues to successively subtract a response corresponding to a closest match and associating a wavelength of the subtracted response until a residual error term is less than 10% of a previous peak.

3. The measurement system of claim 1 where the reflected optical power comprises a plurality of Fiber Bragg Grating (FBG) Gaussian reflection responses.

4. The measurement system of claim 1 where the at least one optical detector comprises a plurality of wavelength-specific optical detectors, each detector providing a reflected power for each detector wavelength.

5. The measurement system of claim 1 where the optical power from the optical interrogator is a broadband optical source.

6. The measurement system of claim 1 where the optical power from the optical interrogator includes a tunable laser.

7. The measurement system of claim 1 where the at least one optical detector comprises a plurality of optical detectors operating concurrently and the optical power from the optical interrogator is a broadband optical source.

8. The measurement system of claim 1 where subtracting a response is operative on a Fourier transform of discrete amplitude values from the plurality of optical detectors.

9. The measurement system of claim 1 where subtracting a response is operative on a continuous representation of reflected amplitude response measured by the at least one optical detector in response to a tunable laser tuned over a range and generating optical power from the optical interrogator.

10. The measurement system of claim 2 where continuing to subtract a response is performed for each measurement sensor until all measurement sensors are subtracted.

11. A sensor system comprising:
    a plurality n of Fiber Bragg Gratings (FBG) arranged on a single optical fiber, each FBG having a unique standard deviation $\sigma$;
    a tunable laser coupling optical energy into the plurality of FBGs;
    a detector operative to measure reflected optical power from the plurality of FBGs;
    a controller operative to generate a response plot g(x) of power vs wavelength, the power measured by the detector and the wavelength varied by the tunable laser to form the response plot;
    the controller operative to iteratively identify a peak response and subtract a proposed FBG response from the response plot to generate a residue;
    the controller continuing to iteratively identify a peak response and subtract a proposed FBG response until the residue is below a threshold, or a number n of iterations have been performed;
    where the tunable laser has a bandwidth which is narrower than a narrowest bandwidth of a sensor FBG by a factor of at least 4.

12. The sensor system of claim 11 where the response plot is a Fourier transform of amplitude vs wavelength multiplied by $$e^{\frac{\gamma^2 \omega^2}{2}}.$$

13. The sensor system of claim 11 where the peak response identifies a wavelength associated with a sensor response.

14. The sensor system of claim 11 where at least one plurality of sensors is in a first wavelength range of the tunable laser and a second plurality of sensors is in a second wavelength range of the tunable laser.

15. A measurement sensor comprising a plurality of fiber Bragg gratings (FBGs) arranged in sequence on a single optical fiber, the FBGs operating in a shared range of wavelengths such that at least one FBG sensor reflects optical energy at a same wavelength as another FBG sensor, the plurality of FBGs receiving optical power from an optical interrogator;
    each of the plurality of gratings having a unique full width half max (FWHM) bandwidth, each of the plurality of gratings reflecting less than 10% of incoming optical power;
    the optical interrogator configured to associate a wavelength to each FBG according to a measured unique FWHM bandwidth.

16. The measurement sensor of claim 15 where a first plurality of FBGs is operative over a first range of wavelengths, each FBG having a unique FWHM bandwidth from other FBG sensors in the first range of wavelengths.

17. The measurement sensor of claim 15 where a first plurality of FBGs is operative over a first range of wavelengths, each FBG having a unique FWHM bandwidth from other FBG sensors in the first range of wavelengths and a second plurality of FBGs is operative over a second range of wavelengths, each FBG having a unique FWHM bandwidth from other FBG sensors in the second range of wavelengths; and where at least one FBG of the first plurality of FBGs has a FWHM which is substantially the same as at a FWHM of least one FBG of the second plurality of FBGs.

* * * * *